No. 766,281.

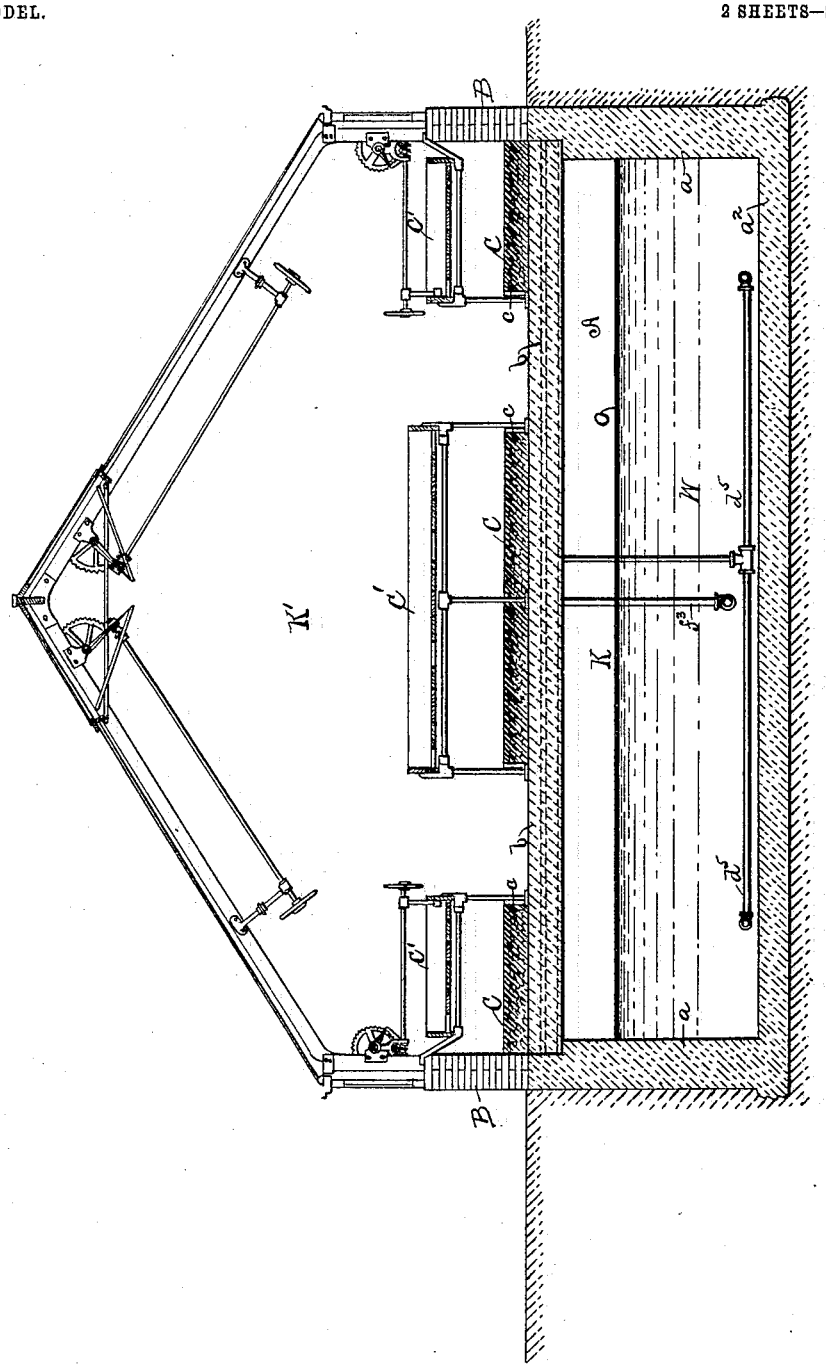

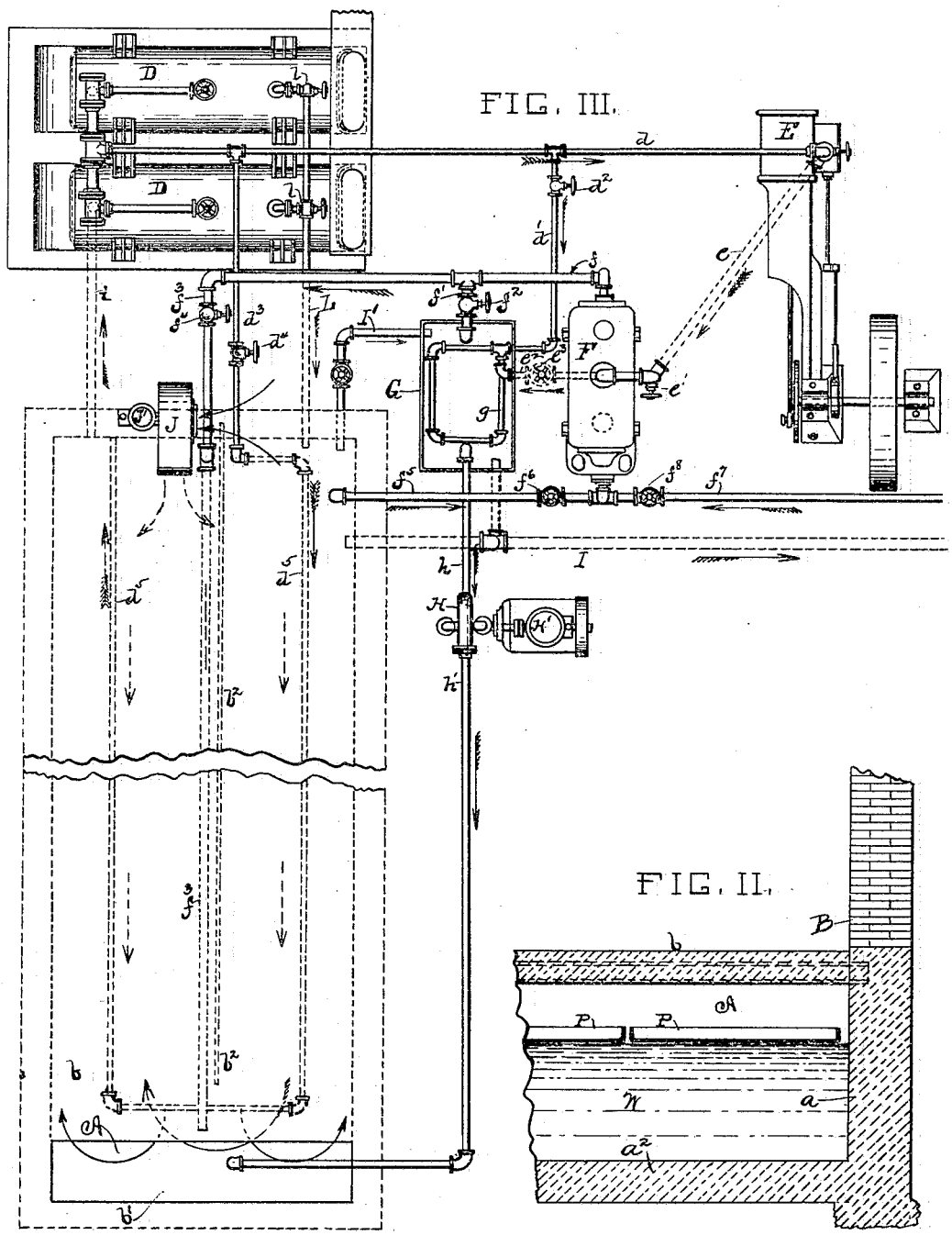

Patented August 2, 1904.

UNITED STATES PATENT OFFICE.

CASSIUS CARROLL PECK, OF ROCHESTER, NEW YORK.

HEATING SYSTEM FOR GREENHOUSES.

SPECIFICATION forming part of Letters Patent No. 766,281, dated August 2, 1904.

Application filed March 2, 1903. Renewed June 17, 1904. Serial No. 212,972. (No model.)

*To all whom it may concern:*

Be it known that I, CASSIUS CARROLL PECK, residing at Rochester, in the county of Monroe and State of New York, have invented a certain new and useful Heating System for Greenhouses, of which the following is a specification sufficient to enable others skilled in the art to which it appertains to make and use the same.

My invention relates to a hot-water heating system for greenhouses, using the term "greenhouses" to comprehensively include all forms of artificially-heated houses and rooms devoted primarily to growth and maintenance of plants.

Means for suitably applying the elements of my invention are shown in the accompanying drawings, in the several figures of which like parts are indicated by the same letters. I do not, however, confine myself to the exact construction or arrangement of parts here shown, as there can be considerable variation in both construction and arrangement without departing from the essential elements of my invention.

In the drawings, Figure 1 is a cross-section of a greenhouse as suitably constructed for embodying my heating system. Fig. 2 is a somewhat enlarged cross-sectional view of the warm-water-reservoir portion of the greenhouse shown in Fig. 1, but showing metal pans on the water-surface. Fig. 3 is a plan view illustrating my invention by showing or indicating the several parts and their relation to each other.

Arrows feathered on both sides indicate flow of steam, those feathered on one side water, and unfeathered arrows the direction of air-currents.

In the several figures, A represents differing forms of a hot-water reservoir for heating greenhouses and propagating-beds in such manner and to such degree as differing conditions require. The foundation-walls of the greenhouse are marked $a$, and these in all cases correspond with the containing-walls of the reservoir, said walls being built either of bricks or of concrete. Where the several reservoirs have a concrete bottom, it is indicated by $a^2$. Metal side walls of the several reservoirs are marked $a^3$, metal covers $a^4$, and metal bottoms $a^5$.

B B are side walls of a greenhouse-building above the level of reservoirs A or above ground-level, and $b$ is the floor of a greenhouse, which in case of Fig. 1 constitutes the cover of reservoir A, said reservoir occupying the whole interior width of the building.

C C are low or floor level propagating-beds or plant-tables. $c$ indicates earth filling of said beds or tables.

C' C' are elevated propagating beds or tables.

A usual roof construction for greenhouses is shown in Fig. 1, but not being a part of my invention it is not lettered.

In Fig. 3, D D are a pair of boilers which are adapted for supplying steam through pipe $d$ to engine E, the exhaust-steam from which flows through pipe $e$ either to surface condenser F (for which a jet-condenser can be substituted) or to pipe-coil $g$ in tank G, pipe $e$ having a valve $e'$ and branch pipe $e^2$, provided with a valve $e^3$ for directing exhaust-steam to either the tank or to the condenser, as desired. Discharge-pipe $f$ from said condenser has a branch $f'$, with valve $f^2$ for admitting circulating water to tank G, and also a branch $f^3$, provided with valve $f^4$ for admitting circulating water directly to reservoir A. By this arrangement all or any part of the circulating water from condenser F can be delivered either into reservoir A or into tank G.

The grouping of apparatus shown in Fig. 3 is not intended to represent distances dividing the several parts. Thus a greenhouse containing reservoir A may be a long way removed from a power-house containing boilers, engines, condensers, heating-tank, and pumps which supply said reservoir. In this case either the circulating-pump of the condenser F or a special pump, as centrifugal pump H, driven by vertical engine H', or both, in connecting with proper piping serve to establish necessary connection between the reservoir and its source of supply for heat and water. With surface condenser F in use the condensing-water can be delivered by its circulating-pump into reservoir A through pipe $f^3$, and thus fully supply heat to the greenhouse, the overflow from the reservoir running to waste through pipe I (shown in broken lines) or else returning to the condenser through suction-pipe $f^5$ or to heater-tank G by pipe I'. During severely cold weather if the temperature of condensing-water should not be sufficiently high for properly warming the greenhouse-space then part or all of said water is turned into tank G and further heated by coil $g$, supplied either with exhaust-steam through pipe $e^2$ or with live steam through pipe $d'$, the centrifugal pump H, with its engine H', (or equivalent mechanism,) being employed for transferring water from tank G through suction-pipe $h$ and delivery-pipe $h'$ to reservoir A, the tank being set sufficiently high to permit its water to flow by gravity to the pump. Where no condenser is used, exhaust-steam from engine E or other engines can be sent through pipe $e$ to coil $g$, and thus provide heated water for delivery by pump H to reservoir A, water thus taken from the tank being returned to it by overflow-pipe I', or if levels will not admit of gravity return a pump can be employed to automatically return water to heating-tank G.

When condenser F is used, its supply of circulating water can be taken either from reservoir A through pipe $f^5$, having a valve $f^6$, or from any other source through pipe $f^7$, having valve $f^8$.

The fan J, driven by vertical engine J', may have its suction connected with air-space K, (shown in Fig. 1,) but is shown in Fig. 3 as taking its air-supply from above the floor-line and delivering it into said air-space. Reservoir A, as shown in Figs. 1 and 3, is intended to extend through the greater part of the length of the greenhouse and to be covered by the greenhouse-floor, except at end opposite the fan, at which end a sufficient opening in floor, as shown at $b'$, Fig. 3, is made to allow free movement of air drawn or forced by fan J through air-space K, Fig. 1. In place of one opening there may be several openings in the floor when found desirable to suit conditions. The service of fan J is to move in a continuous circuit the air in space K and in the body of the greenhouse K', first through K and then through K', for the purpose of transferring heat from water in reservoir A to air and solids in the body of the greenhouse, the moving air acting as a vehicle for carrying away heat by convection and imparting it to solid objects in the greenhouse. By means of this circulation of air the otherwise necessary amount of heating-surface is reduced, and a lower temperature of water in reservoir A is allowable as compared with stagnant air.

To avoid removal of an excessive amount of moisture from water W in reservoir A, I cover the water with oil, grease, or other substance which does not evaporate or change by action of air or water and which will float on the liquid surface either by reason of the lighter gravity of its substance or by reason of its form.

In Fig. 1, O is intended to represent a layer of oil or other equivalent liquid cover resting on the body of water W, and in Fig. 2 P P indicate metal pans which are designed to take the place of oil or other liquid coating of water. Without any cover for the reservoir-water so large a quantity would be evaporated by the air-current as to cause an objectionable amount of precipitation in the form of frost on glass surfaces of a greenhouse inclosure during winter weather and also create too moist an atmosphere for the good of plants.

The construction and arrangement of parts shown in Figs. 1 and 3 are best suited for large commercial greenhouses heated by exhaust-steam from power plants.

When the use of oil or equivalent liquid blanket is objectionable for any reason, I employ metal of such quality as to be little injured by contact of air and water in the presence of heat, said metal being usually in sheet form made into shallow pans for floating on the water, as shown in Fig. 2.

In the system of greenhouse-heating shown in Fig. 3 an important object is to do heating by utilization of exhaust-steam, which would otherwise be wasted either by direct discharge to atmosphere from non-condensing engines or into the condensing water in case of condensing-engines. By my improved system not only can present cost of maintaining greenhouses be greatly reduced wherever exhaust-steam is available for heating water, but better conditions for productiveness are secured, which open new fields for growing vegetables, flowers, and plants of many kinds.

Reservoir A, as shown in Figs. 1 and 3, can be made of large capacity, so as to serve the purpose of storing heat, this being especially desirable in case of use in connection with engines which are run intermittently, as is usually the case. The overflow or surplus water of the reservoir can be constantly returned either to condenser F (or an equivalent jet-condenser) or to heater-tank G to be reheated and returned to the reservoir—that is, until the whole body of water in reservoir A has attained too high a temperature for use in a condenser. The two conditions of large reservoir capacity and constant recirculation of heating water provide for conserving so far as practicable the heat of exhaust-steam. Where this class of heat is not sufficient in quantity to meet requirements for a twenty-four-hour day or where it cannot be had at all, I supply heat for reservoir A by live steam taken direct from boilers D D through pipe $d^3$ to coil $d^5$ in said reservoir, admission of steam being controlled by valve $d^4$. Said coil is shown in solid lines in Fig. 1 and in broken lines in Fig. 3. The water of condensation both from this coil and from coil $g$ in tank G can be returned to boilers D D through a receiver and pump or equivalent mechanism, or otherwise made use of or sent through a trap to a sewer.

Suitable hygrometric condition of atmosphere can be maintained in a greenhouse by exposure of more or less water-surface of the reservoir or reservoirs to the air in or which circulates through the body of the greenhouse, this being an easy way of attaining uniformly good conditions.

The several reservoirs can be heated by direct circulation of water from boilers D D, the reservoirs being set at a proper level with respect to said boilers, in which case the boilers can be employed simply as water-heaters without raising vapor-pressure above the pressure of atmosphere. This arrangement is shown in Fig. 3, where hot-water pipe L, valved to boilers, as shown at $l$ $l$, supplies water to reservoir A by gravity circulation. A central division-wall $b^2$ compels circulation throughout the whole length of reservoir, first in one direction and then in the other direction, the lower portion of reservoir being connected to the bottom of boilers by return-pipe $l'$, which pipe can also be branched and valved for each boiler, although for simplicity this is not shown.

Having described my invention, what I claim, and desire to secure by Letters Patent, is—

1. The hereinbefore-described system of heating a greenhouse, consisting of a source of hot-water supply, a reservoir of heated water connected therewith and located beneath the floor-level and covered by the greenhouse-floor, an air-space between said floor and water in said reservoir, one or more air-ducts for connecting the air-space under the floor with the room above the floor, and mechanism for moving air through the space both above and below said floor, substantially as described and shown, and for the objects set forth.

2. In a system of greenhouse-heating which includes a reservoir of heated water for heating air and solids in a greenhouse, the combination with said reservoir and water contained therein of a non-vaporizing substance which will float in a liquid state on the surface of said water, essentially as shown and set forth.

3. In a system of greenhouse-heating, the combination of an open reservoir of heated water within the greenhouse, mechanical means of circulating the body of air within the greenhouse in contact with the upper surface of said reservoir, an exterior heater for heating the water of said reservoir, a delivery-pipe from the heater to the reservoir, mechanical means for circulating water from said heater to said reservoir, and a return-pipe from the reservoir to the heater, substantially as set forth.

4. In a system of greenhouse-heating, in which a greenhouse is heated by means of a reservoir located in the greenhouse and containing hot water for warming the greenhouse and contents, the combination with said reservoir of a source of live-steam supply, an exterior tank containing water heated by said live steam, mechanism for mechanically circulating heated water from said tank to said reservoir, and pipes for properly connecting the aforesaid parts, substantially as shown and described, and for the purpose set forth.

5. In a system of greenhouse-heating in which a greenhouse is heated by a reservoir of hot water located within the greenhouse, the combination of said reservoir, a heating-tank for heating the water-supply of said reservoir, a pump for delivering water from said heating-tank into said reservoir and compelling its circulation through the reservoir, with a return-pipe for conveying the reservoir-water after circulation through the reservoir back to the aforesaid heater, substantially as shown and described, and for the objects specified.

6. In a system of greenhouse-heating, the combination of a steam-boiler, a steam-engine, an underground reservoir of water in a greenhouse having the upper surface of the water in free communication with the body of air in the greenhouse, exterior means of condensing steam from said engine, mechanical means of circulating condensing water from said condensing apparatus to said reservoir, said means being located between the condenser and the reservoir, a delivery-pipe connecting said water-circulating mechanism with the reservoir, and a return-pipe from the reservoir to the condensing apparatus, essentially as shown and described.

CASSIUS CARROLL PECK.

Witnesses:
   JNO. H. MCANARNEY,
   CHAS. G. SHEPARD.